(12) United States Patent
Mantri (10) Patent No.: US 8,731,305 B1
(45) Date of Patent: May 20, 2014

(54) UPDATING MAP DATA USING SATELLITE IMAGERY (75) Inventor: Anup Mantri, Mountain View, CA (US)

(73) Assignee: Google Inc., Mountain View, CA (US)

( * ) Notice: Subject to any disclaimer, the term of this patent is extended or adjusted under 35 U.S.C. 154(b) by 470 days.

(21) Appl. No.: 13/044,455

(22) Filed: Mar. 9, 2011

(51) Int. Cl.
*G06K 9/48* (2006.01)
*G06K 9/00* (2006.01)
*G06K 9/46* (2006.01)
*G06K 9/66* (2006.01)

(52) U.S. Cl.
USPC ........... 382/197; 382/195; 382/190; 382/181; 701/450

(58) Field of Classification Search
None
See application file for complete search history.

(56) References Cited

U.S. PATENT DOCUMENTS

| | | | | |
|---|---|---|---|---|
| 7,127,085 | B2 * | 10/2006 | Kim et al. ................. | 382/113 |
| 2001/0038718 | A1 * | 11/2001 | Kumar et al. ............. | 382/284 |
| 2007/0014488 | A1 * | 1/2007 | Chen et al. ................ | 382/294 |

OTHER PUBLICATIONS

Klang, Dan. "Automatic detection of change in road date bases using satellite imagery." International Archives of Photogrammetry and Remote Sensing 32 (1988): 293-298.*
Fortier et al., "Automated Updating of Road Information From Aerial Images", in Proceedings of American Socierty Photogrammetry and Remote Sensing Conference, 2000, pp. 1-12.*
Song et al. "Automated geospatial conflation of vector road maps to high resolution imagery." Image Processing, IEEE Transactions on 18.2 (2009): 388-400.*
Zhang, "Towards an operational system for automated updating of road database by integration of imagery and geodata." ISPRS Journal of Photogrammetry and Remote Sensing 58.3 (2004): 166-186.*
Fortier, et al. "Automated correction and updating of road databases from high-resolution imagery." Canadian Journal of Remote Sensing 27.1 (2001): 76.*
Bailloeul, T., et al., "Urban Digital Map Updating From Satellite High Resolution Images Using GIS Data as A Priori Knowledge," 2nd GRSS/ISPRS Joint Workshop on Remote Sensing and Data Fusion over Urban Areas, May 2003, pp. 283-287.
Mokhtarzade, M., et al., "Automatic Road Extraction From High Resolution Satellite Images Using Neural Networks, Texture Analysis, Fuzzy Clustering and Genetic Algorithms," The International Archives of the Photogrammetry, Remote Sensing and Spatial Information Sciences. vol. XXXVII. Part B3b. Beijing 2008, pp. 549-556.
Rafieyan, O., et al., "Updating the Land Cover Map Using Satellite Data. In Order to Integrate Management of Natural Resources," World Applied Sciences Journal 3 (Supple 1), 2008, pp. 48-55.
Tung, C.H., "Updating topographic map using SPOT 5 satellite imagery." The Remote Sensing Center, Ministry of Natural Resources and Environment. ACRS Proceeding 2005, Section 46: Data Processing. DTP2-3 U. (2), 7 Pages.

* cited by examiner

*Primary Examiner* — Thomas Conway
(74) *Attorney, Agent, or Firm* — Fenwick & West LLP (57) ABSTRACT

Map data are overlaid on satellite imagery. A road segment within the map data is identified, and the satellite imagery indicates that the road segment is at a different geographic position than a geographic position indicated by the map data. The endpoints of the road segment in the map data are aligned with the corresponding positions of the endpoints in the satellite imagery. A road template is applied at an endpoint of the road segment in the satellite imagery, and the angle of the road template that matches the angle of the road segment indicated by the satellite imagery is determined by optimizing a cost function. The road template is iteratively shifted along the road segment in the satellite imagery. The geographic position of the road segment within the map data is updated responsive to the positions and angles of the road template.

21 Claims, 5 Drawing Sheets

UPDATING MAP DATA USING SATELLITE IMAGERY

BACKGROUND

1. Field of Art

The present invention generally relates to the field of generating maps and specifically to improving quality of existing maps.

2. Background of the Invention

Digital maps, such as those provided by GOOGLE INC., are used in a wide variety of electronic devices, such as car navigation systems and mobile phones. Users rely on digital maps to provide comprehensive and accurate information about roads for purposes including navigation and route guidance. Therefore, the map data must be very precise or problems can develop. For example, if the map data used by a navigation system do not align precisely with the real world, the navigation system could provide inaccurate or nonsensical directions.

There are large public domain map datasets available. One such dataset is the Topologically Integrated Geographic Encoding and Referencing (TIGER) system available from the United States Census Bureau. The TIGER dataset includes streets, roads, water features, and other boundaries in the United States. However, the TIGER dataset lacks enough precision to support global positioning system (GPS)-based navigation and other such needs. For example, the latitude/longitude coordinates of features in the TIGER dataset do not precisely align with the true latitude/longitude coordinates of the features as determined using GPS.

It would be advantageous to improve the accuracy of public domain map datasets such as the TIGER dataset. If such datasets were made more accurate, the datasets could be used to support GPS-based navigation and other technologies.

SUMMARY

The above and other issues are addressed by a method, computer-readable storage medium, and computer system for updating map data using satellite imagery. An embodiment of the method comprises identifying a road segment within the map data, the satellite imagery indicating that the road segment is at a different geographic position than a geographic position indicated by the map data. The method further comprises updating the geographic position of the road segment within the map data using the geographic position of the road segment indicated by the satellite imagery. The method additionally comprises storing the updated geographic position of the road segment with the map data.

An embodiment of the computer-readable storage medium stores executable computer program instructions for updating map data using satellite imagery, the computer program instructions comprising instructions for identifying a road segment within the map data, the satellite imagery indicating that the road segment is at a different geographic position than a geographic position indicated by the map data. The computer program instructions further comprise instructions for updating the geographic position of the road segment within the map data using the geographic position of the road segment indicated by the satellite imagery, and instructions for storing the updated geographic position of the road segment with the map data.

An embodiment of the computer system for updating map data using satellite imagery comprises a non-transitory computer-readable storage medium storing executable computer program instructions comprising instructions for: identifying a road segment within the map data, the satellite imagery indicating that the road segment is at a different geographic position than a geographic position indicated by the map data, updating the geographic position of the road segment within the map data using the geographic position of the road segment indicated by the satellite imagery, and storing the updated geographic position of the road segment with the map data. The computer system further comprises a processor for executing the computer program instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
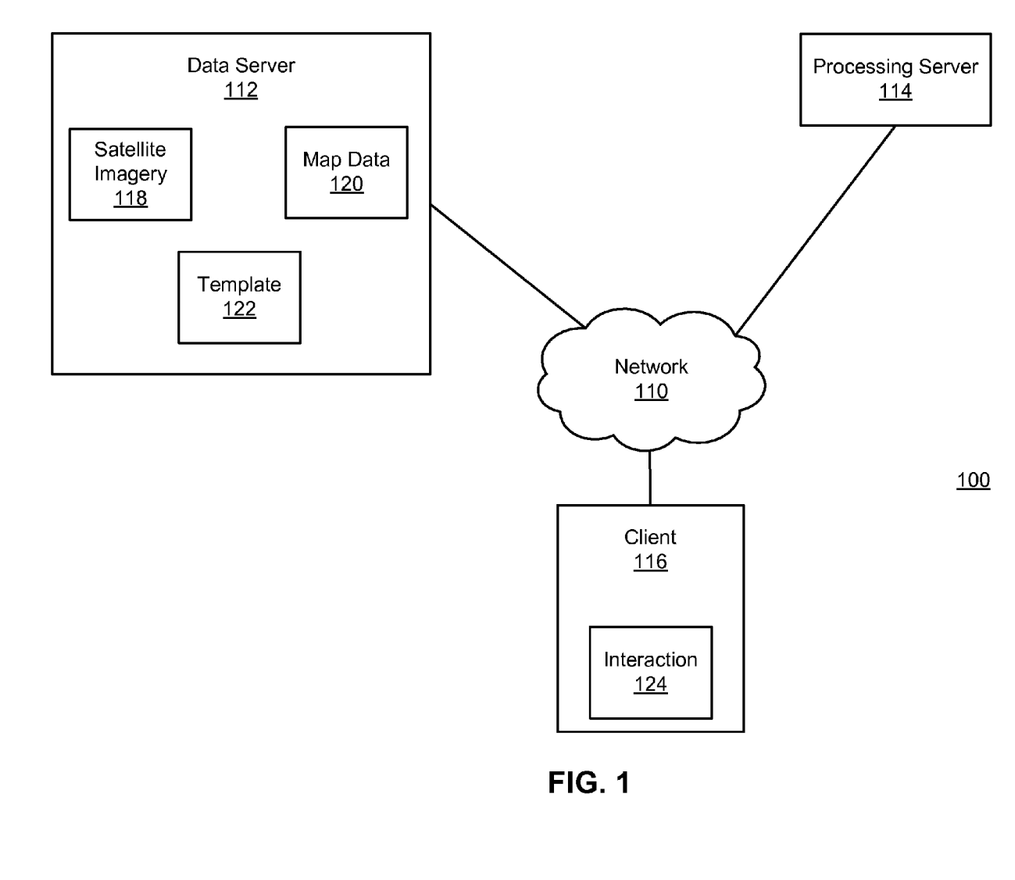
FIG. 1 is a high-level block diagram illustrating an environment for updating map data using satellite imagery according to one embodiment.

FIG. 1 is a high-level block diagram illustrating an environment 100 for updating map data using satellite imagery according to one embodiment. As shown, the environment 100 includes a network 110, a data server 112, a processing server 114 and a client 116. While only one of each entity is shown in FIG. 1 for clarity, embodiments can have multiple servers 112, 114 and many clients 116.

The network 110 represents the communication pathway between the data server 112, processing server 114, and client 116. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

The data server 112 stores data for use in updating map data using satellite imagery. These data are stored in one or more databases such as relational and other types of databases. In one embodiment, the data server 112 stores satellite imagery 118, map data 120, and road template data 122. The data server 112 can also include different and/or additional types of data, as well as map data that have been updated using the techniques described herein.

The satellite imagery 118 includes high-resolution photographs showing geographic features of the Earth (or other planetary body for which maps are being improved). In one embodiment, the imagery is obtained from orbiting satellites and, hence, the imagery is referred to as "satellite imagery." However, the imagery can also be obtained from other sources, such as airplanes or other vehicles, and the term "satellite imagery" includes imagery from such sources.

In one embodiment, the satellite imagery 118 is formed of multiple individual images that are composed together to form a continuous image. The image shows the surface features of a particular geographic area, such as a state, city, or neighborhood. The satellite imagery 118 may also have multiple layers of resolution. For example, a layer of satellite imagery 118 of a city may show only large features such as buildings and highways. Other layers may show the city at, say, the neighborhood level and show features such as minor streets, smaller buildings, and vehicles.

The satellite imagery 118 is very precisely registered with the real world. In other words, the satellite imagery 118 is very precisely aligned with a standard coordinate frame for the Earth, such as the World Geodetic System (WGS) 84, and the position of each image with respect to the standard coordinate frame is known. The locations of features shown in the satellite imagery 118, such as roads, are considered ground truth for the locations of those features. The GPS also uses WGS 84. Thus, if the satellite imagery 118 reveals a particular road intersection to be at a particular latitude/longitude (lat/long), it means that the intersection really is at that lat/long, and that an accurate GPS receiver at that geographic location would agree.

The map data 120 describe roads within a specified geographic area, such as a city, state, country, or continent. In one embodiment, the map data 120 describe features of the roads including the roads' names, geographic locations and intersections. However, the map data may be inaccurate. For example, the geographic location of an intersection of two roads described by the map data 120 may vary from the true location of the intersection as shown by the satellite imagery 118. The map data 120 may also describe other features, such as railroads, bodies of water, and the like. In one embodiment, the map data 120 are derived from the Topologically Integrated Geographic Encoding and Referencing (TIGER) system available from the United States Census Bureau.

The road template data 122 describe one or more templates that are used to automatically detect roads in the satellite imagery 118. In one embodiment, the road template data 122 describe a rectangular road template having a fixed length and width, such as 30 meters in length and seven meters in width. The template has a specified anchor location (e.g., the center of the left side), and a unit vector in the direction of the template (e.g., left-to-right).

The client 116 is a computer or other electronic device used by one or more users to perform activities including using the data stored by the data server 112 to update the map data 120.

In one embodiment, there are multiple clients 116 in communication with the data server 110, and each client is used by a different user to update the map data 120. For example, the map data 120 can be divided into multiple portions, and the portions can be distributed to the multiple clients 116, thereby allowing multiple users to work in parallel to update the map data.

The client 116 includes an interaction module 124 that supports the map-updating functionality. The interaction module 124 provides the user with an interface with which the user can interact to view and manipulate data provided by the data server 110, and to provide data describing the updated maps to the data server and/or processing server 114. The interaction module 124 can be, for example, standalone software or integrated into a web browser or other tool at the client 112.

In one embodiment, the interaction module 124 provides the user with a viewport through which the user can view the satellite imagery 118 and map data 120 for a geographic region. The viewport displays the two types of data as different layers of a single image, such that the map data 120 for a region are overlaid on the satellite imagery 118 for the same region. In addition, the viewport allows the user to zoom into and out of the imagery to view regions of different scales.

The interaction module 124 also provides the user with tools to move the roads and other features shown in the map layer relative to the satellite layer (and thus relative to the features' locations in the standard coordinate frame). In one embodiment, the interaction module 124 displays roads in the map data 120 with a set of vertices disposed along the road. For example, the vertices can be located at intersections of roads, and every 30 meters along lengths of road. The user can use the vertices to move the roads relative to the satellite layer.

In one embodiment, the user uses the interaction module 124 to view a region having a segment of road with intersections at both ends. The user identifies the vertices for the intersections, and visually identifies the corresponding intersection shown in the satellite imagery 118. The user moves the intersection vertices in the map data 120 so that the vertices align with the locations of the intersections in the satellite imagery 118. Thus, the intersections in the map data 120 are aligned with the intersections in the satellite layer.

In one embodiment, the processing server 114 preprocesses the satellite imagery to supply cost function values that measures the likelihood that pixels within the satellite imagery 118 show a road. The interaction module 124 uses a road template in the road template data 122 and optimizes a cost function based on the cost function values to automatically align the segment of road between the intersections with the location of the road segment as shown in the satellite imagery 118, even if the road segment is curved. In one embodiment, the interaction module 124 "snaps" the display of the road segment to the location of the road segment as determined using the template. The user verifies that the road segment properly aligns with the satellite imagery 118. If the user approves of the alignment, the user causes the interaction module 124 to update the map data 120 with the new location of the road segment. The updated map data 120 are stored to the data server 112 or elsewhere.

Automatically aligning the road segment with its location as shown in the satellite imagery 118 thus results in saving labor versus having the user manually align the roads in the map data 120 with the satellite imagery 118. Moreover, the distributed system having multiple clients 116 allows large amounts of map data 120 to be updated quickly. The updated map data 120 can then be used for GPS navigation or for other purposes where precise map data are required or desired.

Figure 2:
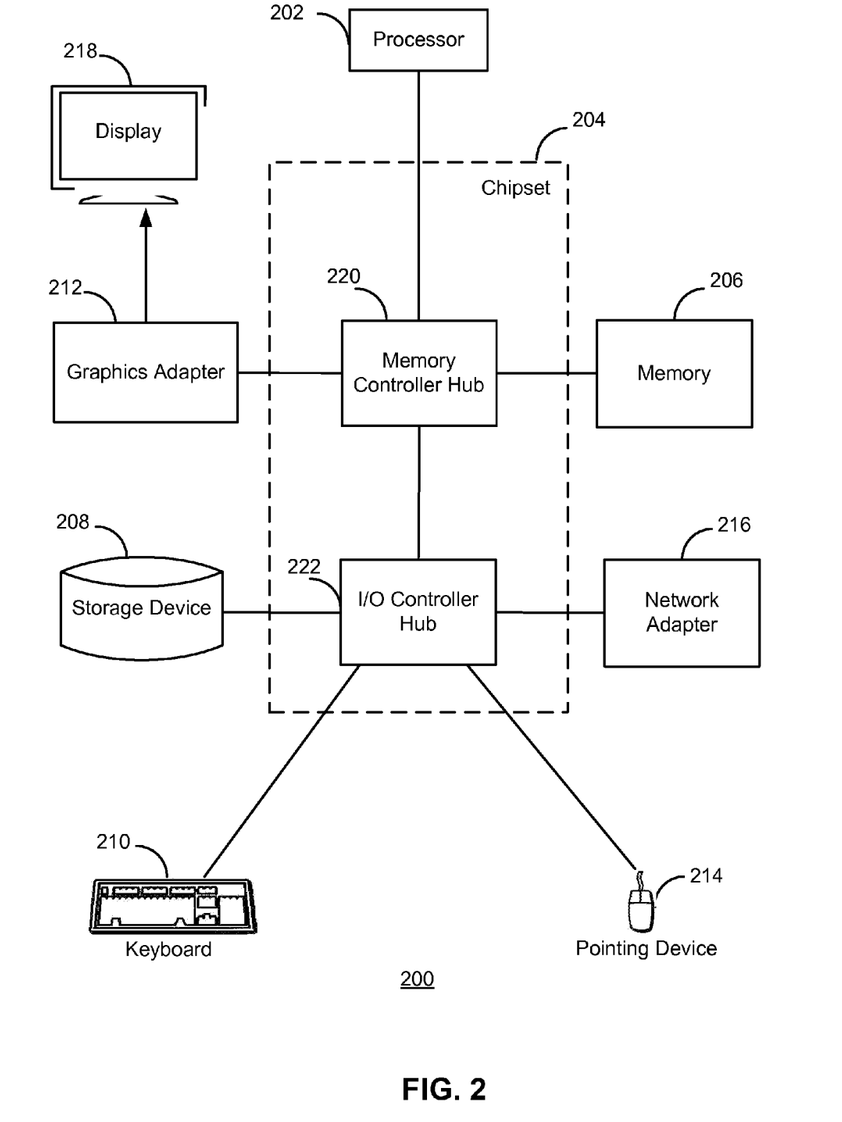
FIG. 2 is a high-level block diagram illustrating an example of a computer for use as a data server, a processing server, and/or a client, in accordance with one embodiment.

FIG. 2 is a high-level block diagram illustrating an example of a computer 200 for use as a data server 112, a processing server 114, and/or a client 116, in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 101. Some embodiments of the computer 200 have different and/or other components than those shown in FIG. 2. For example, the data server 112 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
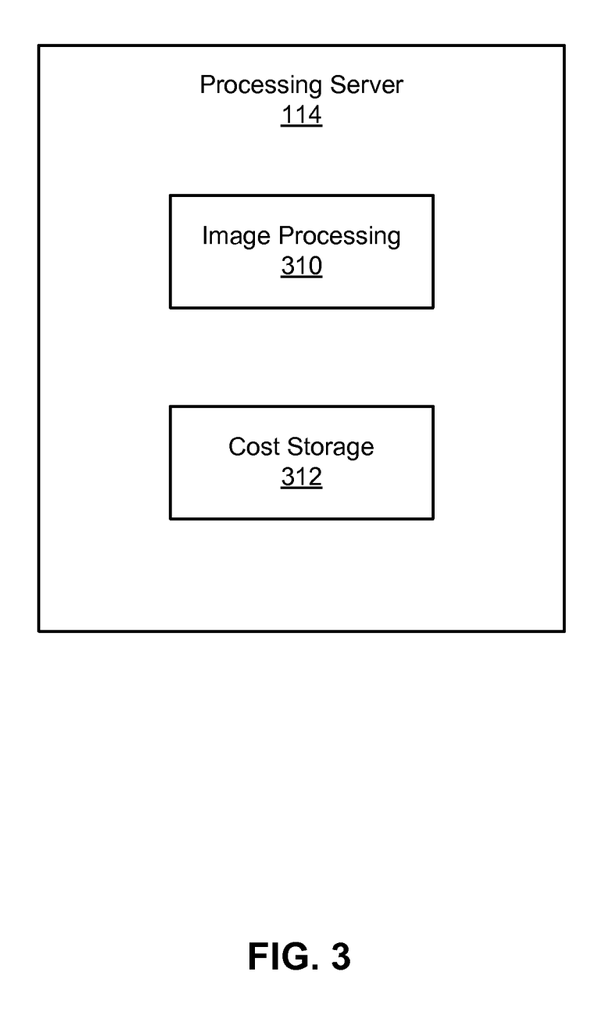
FIG. 3 is a high-level block diagram illustrating a detailed view of the processing server according to one embodiment.

FIG. 3 is a high-level block diagram illustrating a detailed view of the processing server 114 according to one embodiment. As shown in FIG. 3, the processing server 114 includes multiple modules. In some embodiments, the functions are distributed among the modules in a different manner than described herein. Moreover, the functions are performed by other entities in some embodiments, such as by the data server 112 or client 116 illustrated in FIG. 1. In one embodiment, the functions attributed to the processing server 114 are performed by the interaction module 124 at the client 116 and the processing server is absent.

An image processing module 410 processes the satellite imagery 118 to support automated identification of roads displayed therein. In one embodiment, the image processing module 410 pre-processes the satellite imagery, so that the processed images can subsequently be used by other entities to identify roads and thus update the map data 120. In another embodiment the image processing module 410 processes particular images within the satellite imagery 118 in real-time, as those images are used to update the map data 120.

The image processing module 410 processes the satellite imagery 118 to support an optimization using a cost function. The cost function measures the likelihood that pixels within the satellite imagery 118 show a road. Typically, the pixels of a road have a common intensity (i.e., color) and are organized in a common direction. In other words, a road in the satellite imagery 118 is represented as a line of similarly-colored pixels. In contrast, pixels showing other features in the satellite imagery 118, such as houses and foliage, tend to have greater variation in intensity and no particular direction. In one embodiment, the image processing module 410 uses these qualities of roads to assign each pixel in the satellite imagery 118 (or a selected subset of pixels/images within the imagery) a value describing the cost function for the pixel.

To assign the cost function values to the pixels in an image, an embodiment of the image processing module 410 converts the satellite image from color to grayscale. Usually, a satellite image is originally encoded in a red-green-blue (RGB) representation. The image processing module 410 converts the image from the RGB representation to a grayscale representation. The image processing module 410 then smoothes the grayscale image to reduce inhomogeneities in pixel magnitudes. The smoothing reduces differences in intensities of adjacent pixels. In one embodiment, the image processing module 310 uses a Gaussian filter to smooth the image. The sigma for the Gaussian filter is set to do only a small amount of smoothing so that the features of roads in the image are preserved.

The image processing module 410 computes the Hessian matrix of the smoothed satellite image for each pixel of the image. It then computes the eigenvalues and eigenvectors of the Hessian matrix. The eigenvector corresponding to the eigenvalue with the largest absolute value describes the direction of the most curvature. In other words, it is orthogonal to the direction of least change with respect to pixel intensity (i.e., the direction of the road). The cost function values for a pixel includes its direction value (i.e., the vector orthogonal to the first eigenvector), and its magnitude value (i.e., the amount of curvature) as computed from the Hessian matrix of the grayscaled and smoothed image.

Other embodiments of the processing module 410 use different techniques to compute the cost functions for the pixels. For example, one embodiment uses the RGB version of the satellite image and exploits the color information in the image to assign values to pixels indicating the likelihood of whether the pixels show a road. Another embodiment does not smooth the image prior to computing the Hessian matrix.

A cost storage module 312 in the processing server 114 stores the cost function values for the pixels. In one embodiment, the cost storage module 312 stores the cost function values in association with the corresponding pixels in the original satellite imagery 118. For example, the cost storage module 312 can embed the cost function values within the satellite imagery 118 stored by the data server 112. The cost storage module 312 can also store the cost function values separately from the satellite imagery 118 along with information linking the cost function values to the associated pixels. The cost storage module 312 can store the cost function values in the data server 112, within the processing server 114, and/or at other locations.

Figure 4:
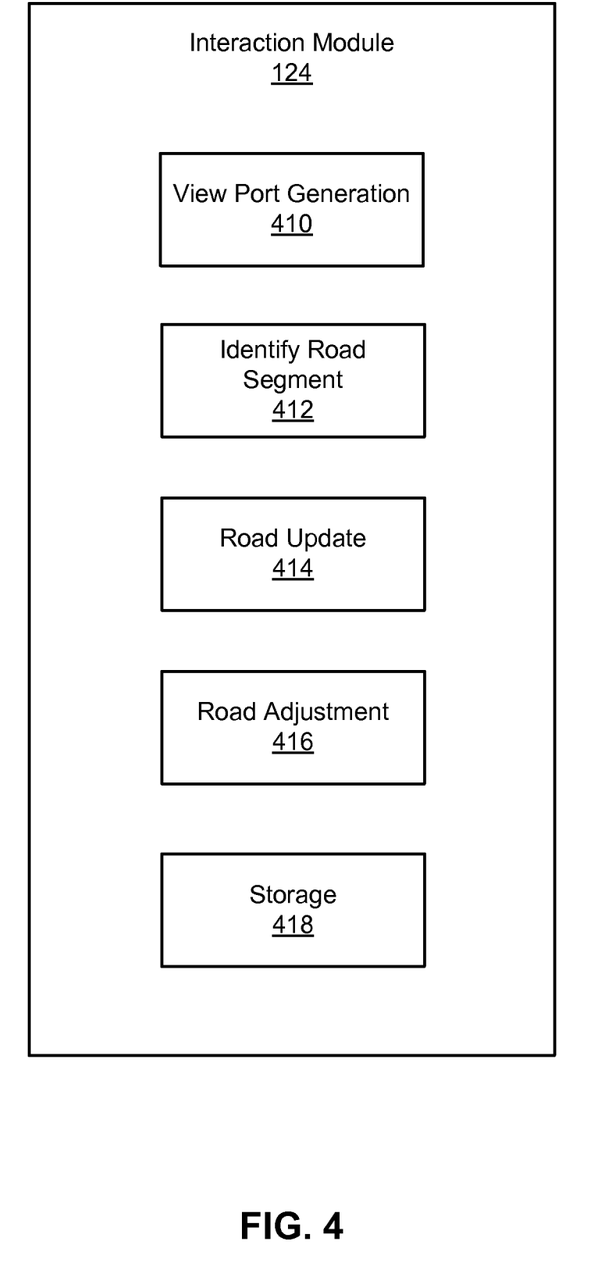
FIG. 4 is a high-level block diagram illustrating a detailed view of the interaction module according to one embodiment.

The cost function values are used by the interaction module 124 of the client 116 to update the map data 120. FIG. 4 is a high-level block diagram illustrating a detailed view of the interaction module 124 according to one embodiment. As shown in FIG. 4, the interaction module 124 itself includes multiple modules. In some embodiments, the functions are distributed among the modules in a different manner than described herein. Moreover, the functions are performed by other entities in some embodiments, such as by the data server 112 or processing server 114 illustrated in FIG. 1.

The interaction module 124 includes a viewport generation module 410 for generating a viewport displaying the satellite imagery 118 and map data 120 for a geographic region to a user of the client 116. In one embodiment, the viewport generation module 410 generates an initial viewport based on instructions received from the data server 112 and/or user. For example, the data server 112 can include data describing a region of map data 120 that needs to be updated, and instruct the viewport generation module 410 to generate a viewport showing this region. The viewport generation module 410, in turn, receives the satellite imagery 118 and map data 120 for the region from the data server 112 and displays the data within the viewport. The viewport generation module 410 can also interact with the user of the client 116 to receive instructions to perform a translation on the viewport, such as a pan or zoom through the geographic region. The viewport generation module 410 identifies the new geographic region to show in the viewport given the requested translation, receives the appropriate satellite imagery 118 and map data 120 for the new region from the data server 112, and displays the new region in the viewport.

As discussed above, the generated viewport in one embodiment displays an image showing the map data 120 for the region overlaid on the satellite imagery 118. The map data 120 includes a road segment, such as portion of a road bounded by intersections at both ends. The viewport generation module 410 displays vertices along the road segment. In one embodiment, there is a vertex at each intersection, and at predetermined geographic distances (e.g., 30 meters) along the road segment between the intersections. The user can use user interface (UI) controls, such as a cursor controlled by a mouse, to select a vertex and move it, thereby moving the geographic location of the road in the map data 120. Typically, the user will use the UI to move the vertices of the intersections of a road segment in the map data 120 so that the intersections align with the locations of the intersections shown in the satellite imagery 118.

A road segment identification module 412 identifies a road segment to be updated. That is, it identifies a road segment that will have its geographic position according to the map data 120 modified to match the segment's position according to the satellite imagery 118. In one embodiment, the user uses the UI to select the vertices describing the road segment to be updated, and activates the road segment identification module 412. For example, the user can use the UI to select the vertices at intersections defining the ends of a road segment, and then select an "update" button or similar UI control to indicate that the identified road segment is to be updated.

In another embodiment, the road segment identification module 412 automatically identifies the road segment. For example, the road segment identification module 412 can analyze the map data 120 to identify an intersection and the shape of the intersection at an end of a road segment. The road segment identification module 412 can then generate a template in the shape of the intersection or use an existing template in the road template data 122, and apply the intersection template to the satellite imagery 118 to find a portion of the satellite imagery that fits the template. Once the intersection is located in the satellite imagery, the road segment identification module 412 can move the vertex for the intersection in the map data 120 to align with the location in the satellite imagery 118. The road segment identification module 412 can then repeat this process to identify and move the intersection at the opposite end of the road segment.

The road segment identification module 412 identifies the road segment to a road update module 414. The road update module 414 updates the position of the road segment by moving the position of the road segment in the map data 120 to the real position of the road as indicated by the satellite imagery 118. In one embodiment, the road update module 414 determines the real position of the road by performing an optimization using the cost function values stored by the processing server 114.

Specifically, an embodiment of the road update module 414 obtains a road template from the road template data 122 and applies the template to the satellite imagery 118. Recall that the road template has an anchor location and a unit vector in the direction of the template. The road update module 414 initially places the anchor location of the template over a vertex at an endpoint of the road segment (which is the location of the endpoint in both the road data and the satellite imagery). For example, the road update module 414 can place the left-center side of the template over the vertex specifying the intersection at the left side of the road segment. Moreover, the road update module 414 sets the initial angle of the template based on the map data 120. For example, if the map data 120 indicate that the road curves 30° to the North, the road update module 414 initially angles the template 30° to the North.

Starting from this initial angle, the road update module 414 optimizes the cost function to determine the angle of the template that best matches the angle of the road according to the satellite imagery 118. To perform the optimization, the road update module 414 determines the direction components of the cost function values for the pixels of the satellite imagery 118 that are within (i.e., underlie) the boundary of the template. The road update module 414 computes the cost function as the negative sum of the weighted dot products of the unit vector of the template with the direction components of the pixels within the template. The dot product produces a value for each pixel indicating how well the direction of the pixel aligns with direction (i.e., rotation) of the template, with a greater value indicating greater alignment.

Specifically, in one embodiment the cost function $f$ for an angle $\theta$ of the template $T_\theta$ is as follows:

$$f(\theta) = -\sum_{\vec{x} \in T_\theta} \lambda_1(\vec{x}) |\vec{u}_\theta \cdot \vec{v}_2(\vec{x})|,$$

where $\vec{x}$ is the coordinate vector for the location, $\vec{u}_\theta$ is the unit vector in the direction of $\theta$, $\lambda_1$ is the larger of the two eigenvalues of the Hessian of the smoothed image at x, and $\vec{v}_2$ is the eigenvector corresponding to the smaller of the two eigenvalues. The function can vary in other embodiments.

The road update module 414 optimizes the cost function by rotating the template about its anchor and computing the cost function for each angle of rotation. In one embodiment, the road update module 414 rotates the template in small increments within a predetermined range from its initial rotation, and selects the angle that produces the minimum value of the cost function as the correct angle. For example, if the template is initially angled 30° in the reference frame, the road update module 414 can compute the cost function at 2° increments within ±10° of the initial rotation, so that it identifies the optimal rotation within the range of 20° to 40°. In one embodiment, a factor is used to penalize deviations of the angle from the previous angle proportional to the difference between the cost function values of the two angles in order to damp oscillations.

Once the road update module 414 determines the optimal angle (i.e., the angle having the smallest cost function), it establishes the road segment as a line segment passing from the anchor position of the template (e.g., the left-center edge of the template) through the location of the template opposite the anchor position (e.g., the right-center edge of the template). The road update module 414 then shifts the template in the direction of the template's unit vector, so that the anchor position of the template is centered on the location formerly opposite the anchor position (e.g., the left-center edge of the template is shifted to the former location of the right-center edge of the template). The road update module 414 again sets the initial angle of the template based on the map data 120, optimizes the angle using the cost function, and establishes the position of the road segment based on the optimal angle. The road update module 414 then shifts the template, and iterates the optimization, update, and shifting process until the template overlies the vertex at the endpoint of the road segment opposite the starting endpoint.

Thus, by using the cost function and template, the road update module 414 identifies the location of the road in the satellite imagery 118 and uses it to update the position of the road segment in the map data Different embodiments of the road update module 414 use different techniques than those described above to update the position of the road segment in the map data. For example, the road update module 414 can use road templates of different sizes and/or shapes.

A road adjustment module 416 makes adjustments to the updated position of the road segment in the map data 120. The optimization performed by an embodiment of the road update module 414 is open-ended in that a subsequent optimization is not affected by a previous optimization. As a result, the locations of the vertices defined by the anchor points of the templates may not be optimally aligned along the road segment. The road adjustment module 416 adjusts the position of the road to account for such conditions.

In one embodiment, the road adjustment module 416 applies a B-spline interpolation function to the vertices of the road segment. This function adjusts the road segment into a smooth curve that passes through to the road's vertices. Other embodiments of the road adjustment module 416 make different adjustments and/or use different interpolation functions to smooth the road segment.

In addition, an embodiment of the road adjustment module 416 allows the user to adjust the updated position of the road segment. In one embodiment, the road adjustment module 416 displays the updated map data 120 overlaid on the satellite imagery 118 in the viewport. The user can view the updated map data 120 and use the UI tools to adjust the vertices of the road segment. One embodiment of the road adjustment module 416 allows the user to adjust the vertices before and after the interpolation function is applied.

In one embodiment, the road update 414 and road adjustment 416 modules work in tandem to visually display the updated position of the road segment, overlaid on the satellite imagery 118, to the user. For example, the road update module 414 can pass the updated position of the road segment to the road adjustment module 416. The latter module 416 can then apply the interpolation and interact with the viewport generation module 410 to cause the road segment to snap from its former position in the map data 120 to its updated position. The "snap" can be, for example, an animation that shows the road segment quickly moving from its original position to the updated position, so that the user can visually appreciate the extent of the update. Alternatively, the snap can be displayed at other times, such as after the road update module 414 updates the position of the road segment.

A storage module 418 stores the updated map data 120. In one embodiment, the storage module 416 sends updated positions of road segments to the data server 112. The data server 112 can store the updated positions within the existing map data 120, or as part of a separate data set. In other embodiments the storage module 416 stores the updated map data locally and/or sends the updated map data to other servers for storage.

Figure 5:
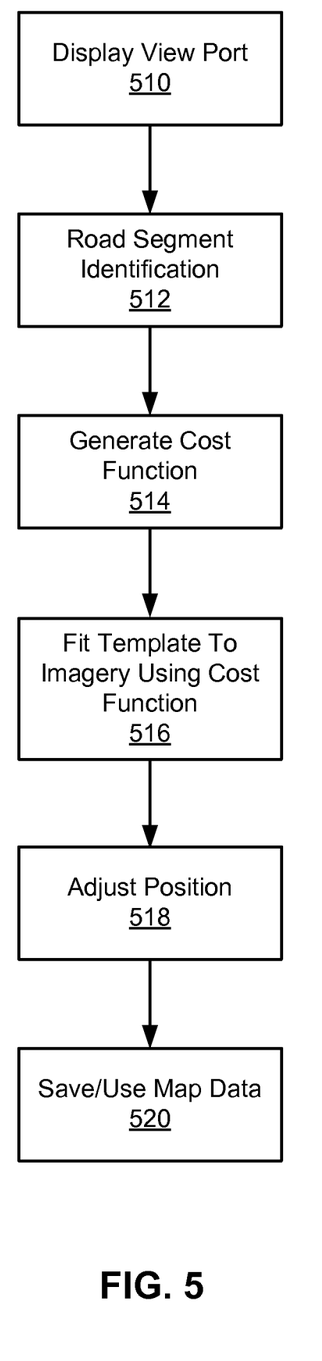
FIG. 5 is a flowchart illustrating a method of updating map data according to one embodiment.

FIG. 5 is a flowchart illustrating a method of updating map data 120 according to one embodiment. The method is performed by one or more of the entities shown in FIG. 1 depending upon the embodiment. For example, some steps of the method can be performed by the interaction module 124 at the client 116 while other steps are performed by the processing server 114 and/or data server 112. In addition, other embodiments can perform the steps in different orders and can include different and/or additional steps.

The interaction module 124 displays a viewport to the user of the client 116. The viewport shows the map data 120 overlaid on the satellite imagery 118. The map data 120 in the viewport include a road, and vertices are disposed along the road. A road segment in the map data 120 is identified for updating. The interaction module 124 can receive an identification of the road segment when the user selects and moves the vertices defining the endpoints of the road segment. For example, the user can identify vertices in the map data 120 corresponding to intersections of a road, and move the vertices in the map data 120 to align with the same intersections in the satellite imagery 118. Alternatively, the interaction module 124 can use templates to automatically identify road intersections and move the vertices for the intersections in the map data 120 to align with satellite imagery 118.

Cost function values measuring the likelihood that pixels within the satellite imagery 118 show a road are generated 514. Depending upon the embodiment, the cost function values can be pre-generated, before the user identifies a road segment, can be generated in real-time, or generated using a combination of pre- and real-time generation. A road template is fit 516 to the satellite imagery 118 using the cost function values. The road template is initially placed at an endpoint of the road template. The cost function is optimized using the pixels of the satellite imagery 118 that are within the boundaries of the template to determine the angle of the template that best matches the angle of the road. The road template is then shifted in the direction of its unit vector and the optimization/shifting process is repeated until the template overlies the other endpoint of the road segment. The position of the road segment in the map data 120 is updated to match the position of the road in the satellite data as described by the template positions.

In one embodiment, the updated position of the road segment in the map data 120 is then adjusted 581. The curve formed by the road segment can be smoothed using an interpolation function. In addition, the user can manually adjust the road segment by moving the vertices. The adjusted position of the road segment in the map data 120 is saved 520. The saved map data 120 can then be used for GPS navigation and/or for other purposes.

Upon reading this disclosure, those of skill in the art will appreciate that additional alternative structural and functional designs are possible. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of updating map data using satellite imagery, comprising:
   identifying a road segment within the map data, the satellite imagery indicating that the road segment is at a different geographic position than a geographic position indicated by the map data;
   generating cost function values for a cost function measuring a likelihood that pixels of the satellite imagery show a road, generating the cost function values comprising:
      computing Hessian matrices for pixels of an image of the satellite imagery, the Hessian matrices producing eigenvectors for the pixels; and
      determining direction values for the pixels responsive to the pixels' eigenvectors using the cost function;
   identifying an endpoint of the road segment within the map data aligned with a corresponding endpoint of the road segment in the satellite imagery;
   applying a road template at the corresponding endpoint in the satellite imagery;
   determining an angle of the road template that matches an angle of the road segment indicated by the satellite imagery by optimizing the cost function based at least in part on cost function values assigned to pixels of the satellite imagery within a boundary of the road template;
   updating the geographic position of the road segment within the map data using the responsive to the determined angle of the road template; and
   storing the updated geographic position of the road segment with the map data.

2. The method of claim 1, wherein identifying a road segment within the map data comprises:
   displaying a viewport to a user, the viewport showing the map data overlaid on the satellite imagery and having a user interface (UI); and
   receiving from the user an identification of endpoints of the road segment responsive to the user using the UI to align the endpoints of the road segment within the map data with corresponding geographic locations of the endpoints indicated by the satellite imagery in the displayed viewport.

3. The method of claim 1, further comprising:
   identifying a second endpoint of the road segment within the map data aligned with a corresponding second endpoint of the road segment in the satellite imagery;
   shifting the road template to a new position along the road segment indicated by the satellite imagery; and
   iterating the determining the angle of the road template, updating the geographic position of the road segment, and shifting the road template until the road template overlays the second endpoint of the road segment in the satellite imagery.

4. The method of claim 1,
   wherein optimizing the cost function comprises minimizing a negative sum of weighted dot products of a unit vector of the road template with direction values assigned to the pixels of the satellite imagery within the boundary of the road template.

5. The method of claim 1, wherein updating the geographic position of the road segment within the map data comprises:
   adjusting positions of vertices of the road segment within the map data to smooth the road segment.

6. The method of claim 1, wherein identifying a road segment within the map data aligned with a corresponding endpoint of the road segment in the satellite imagery comprises:
   identifying the intersection at an endpoint of the road segment within the map data;
   determining a shape of the intersection using the map data; and
   finding an intersection within the satellite imagery corresponding to the intersection at the endpoint of the road segment within the map data responsive to the shape of the intersection.

7. The method of claim 6, wherein finding the intersection within the satellite imagery comprises:
   applying a template having the shape of the intersection to the satellite imagery to find an intersection in the satellite imagery that fits the template.

8. A non-transitory computer-readable storage medium storing executable computer program instructions for updating map data using satellite imagery, the computer program instructions comprising instructions for:
   identifying a road segment within the map data, the satellite imagery indicating that the road segment is at a different geographic position than a geographic position indicated by the map data;
   generating cost function values for a cost function measuring a likelihood that pixels of the satellite imagery show a road, generating the cost function values comprising:
      computing Hessian matrices for pixels of an image of the satellite imagery, the Hessian matrices producing eigenvectors for the pixels; and
      determining direction values for the pixels responsive to the pixels' eigenvectors using the cost function;
   identifying an endpoint of the road segment within the map data aligned with a corresponding endpoint of the road segment in the satellite imagery;
   applying a road template at the corresponding endpoint in the satellite imagery;
   determining an angle of the road template that matches an angle of the road segment indicated by the satellite imagery by optimizing the cost function based at least in part on cost function values assigned to pixels of the satellite imagery within a boundary of the road template;
   updating the geographic position of the road segment within the map data responsive to the determined angle of the road template; and
   storing the updated geographic position of the road segment with the map data.

9. The computer-readable storage medium of claim 8, wherein identifying a road segment within the map data comprises:
   displaying a viewport to a user, the viewport showing the map data overlaid on the satellite imagery and having a user interface (UI); and
   receiving from the user an identification of endpoints of the road segment responsive to the user using the UI to align the endpoints of the road segment within the map data with corresponding geographic locations of the endpoints indicated by the satellite imagery in the displayed viewport.

10. The computer-readable storage medium of claim 8, further comprising:
    identifying a second endpoint of the road segment within the map data aligned with a corresponding second endpoint of the road segment in the satellite imagery;
    shifting the road template to a new position along the road segment indicated by the satellite imagery; and
    iterating the determining the angle of the road template, updating the geographic position of the road segment, and shifting the road template until the road template overlays the second endpoint of the road segment in the satellite imagery.

11. The computer-readable storage medium of claim 8, wherein optimizing the cost function comprises minimizing a negative sum of weighted dot products of a unit vector of the template with direction values assigned to the pixels of the satellite imagery within the boundary of the road template.

12. The computer-readable storage medium of claim 8, wherein updating the geographic position of the road segment within the map data comprises:
adjusting positions of vertices of the road segment within the map data to smooth the road segment.

13. The computer-readable storage medium of claim 8, wherein identifying a road segment within the map data aligned with a corresponding endpoint of the road segment in the satellite imagery comprises:
identifying an intersection at the endpoint of the road segment within the map data;
determining a shape of the intersection using the map data; and
finding an intersection within the satellite imagery corresponding to the intersection at the endpoint of the road segment within the map data responsive to the shape of the intersection.

14. The computer-readable storage medium of claim 13, wherein finding the intersection within the satellite imagery comprises:
applying a template having the shape of the intersection to the satellite imagery to find an intersection in the satellite imagery that fits the template.

15. A computer system for updating map data using satellite imagery, comprising:
a non-transitory computer-readable storage medium storing executable computer program instructions comprising instructions for:
identifying a road segment within the map data, the satellite imagery indicating that the road segment is at a different geographic position than a geographic position indicated by the map data;
generating cost function values for a cost function measuring a likelihood that pixels of the satellite imagery show a road, generating the cost function values comprising:
computing Hessian matrices for pixels of an image of the satellite imagery, the Hessian matrices producing eigenvectors for the pixels; and
determining direction values for the pixels responsive to the pixels' eigenvectors using the cost function;
identifying an endpoint of the road segment within the map data aligned with a corresponding endpoint of the road segment in the satellite imagery;
applying a road template at the corresponding endpoint in the satellite imagery;
determining an angle of the road template that matches an angle of the road segment indicated by the satellite imagery by optimizing the cost function based at least in part on cost function values assigned to pixels of the satellite imagery within a boundary of the road template;
updating the geographic position of the road segment within the map data responsive to the determined angle of the road template; and
storing the updated geographic position of the road segment with the map data; and
a processor for executing the computer program instructions.

16. The computer system of claim 15, wherein identifying a road segment within the map data comprises:
displaying a viewport to a user, the viewport showing the map data overlaid on the satellite imagery and having a user interface (UI); and
receiving from the user an identification of endpoints of the road segment responsive to the user using the UI to align the endpoints of the road segment within the map data with corresponding geographic locations of the endpoints indicated by the satellite imagery in the displayed viewport.

17. The computer system of claim 15, further comprising:
identifying a second endpoint of the road segment within the map data aligned with a corresponding second endpoint of the road segment in the satellite imagery;
shifting the road template to a new position along the road segment indicated by the satellite imagery; and
iterating the determining the angle of the road template, updating the geographic position of the road segment, and shifting the road template until the road template overlays the second endpoint of the road segment in the satellite imagery.

18. The computer system of claim 15,
wherein optimizing the cost function comprises minimizing a negative sum of weighted dot products of a unit vector of the template with direction values assigned to the pixels of the satellite imagery within the boundary of the road template.

19. The computer system of claim 15, wherein updating the geographic position of the road segment within the map data comprises:
adjusting positions of vertices of the road segment within the map data to smooth the road segment.

20. The computer system of claim 15, wherein identifying a road segment within the map data aligned with a corresponding endpoint of the road segment in the satellite imagery comprises:
identifying an intersection at the endpoint of the road segment within the map data;
determining a shape of the intersection using the map data; and
finding an intersection within the satellite imagery corresponding to the intersection at the endpoint of the road segment within the map data responsive to the shape of the intersection.

21. The computer system of claim 20, wherein finding the intersection within the satellite imagery comprises:
applying a template having the shape of the intersection to the satellite imagery to find an intersection in the satellite imagery that fits the template.

* * * * *

UNITED STATES PATENT AND TRADEMARK OFFICE
CERTIFICATE OF CORRECTION

PATENT NO. : 8,731,305 B1  
APPLICATION NO. : 13/044455  
DATED : May 20, 2014  
INVENTOR(S) : Anup Mantri Page 1 of 1

It is certified that error appears in the above-identified patent and that said Letters Patent is hereby corrected as shown below:

In the Claims

Column 11, Claim 1, line 27, delete "within the map data using the responsive to the determined" and insert --within the map data responsive to the determined--.

Signed and Sealed this
Fourteenth Day of April, 2015

Michelle K. Lee
*Director of the United States Patent and Trademark Office*